(12) United States Patent
Pennisi

(10) Patent No.: US 8,964,816 B2
(45) Date of Patent: Feb. 24, 2015

(54) RE-CONFIGURABLE RECEIVER ARCHITECTURE FOR CABLE TRANSMISSION

(71) Applicant: QUALCOMM Incorporated, San Diego, CA (US)

(72) Inventor: Salvatore Pennisi, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 13/765,316

(22) Filed: Feb. 12, 2013

(65) Prior Publication Data

US 2014/0226701 A1 Aug. 14, 2014

(51) Int. Cl.
| | | |
|---|---|---|
| H04B 1/00 | (2006.01) | |
| H04L 1/02 | (2006.01) | |
| H04B 1/26 | (2006.01) | |
| H04B 1/30 | (2006.01) | |

(52) U.S. Cl.
CPC ........... *H04L 1/02* (2013.01); *H04B 1/005* (2013.01); *H04B 1/26* (2013.01); *H04B 1/30* (2013.01)
USPC .......................................................... 375/150

(58) Field of Classification Search
None
See application file for complete search history.

(56) References Cited

U.S. PATENT DOCUMENTS

| | | | |
|---|---|---|---|
| 5,937,013 A | | 8/1999 | Lam et al. |
| 6,807,224 B1* | | 10/2004 | Takahashi et al. ............ 375/150 |
| 8,310,387 B2 | | 11/2012 | Harris et al. |
| 2005/0107059 A1 | | 5/2005 | Lehning et al. |
| 2006/0098721 A1* | | 5/2006 | Rabaeijs et al. ............... 375/150 |
| 2007/0098118 A1* | | 5/2007 | Muhammad et al. ......... 375/344 |
| 2007/0111697 A1 | | 5/2007 | Bellantoni |
| 2007/0140382 A1 | | 6/2007 | Qian |
| 2008/0112519 A1 | | 5/2008 | Jung et al. |
| 2010/0195767 A1* | | 8/2010 | Tsai et al. ...................... 375/316 |
| 2011/0243287 A1* | | 10/2011 | Kitsunezuke .................. 375/350 |

FOREIGN PATENT DOCUMENTS

| | | |
|---|---|---|
| CN | 101432974 A | 5/2009 |
| EP | 1207627 A1 | 5/2002 |
| EP | 1228601 A1 | 8/2002 |
| WO | 0231962 A2 | 4/2002 |

OTHER PUBLICATIONS

International Search Report and Written Opinion—PCT/US2014/011349—ISA/EPO—Apr. 24, 2014.

\* cited by examiner

*Primary Examiner* — Leon-Viet Nguyen
(74) *Attorney, Agent, or Firm* — Mahamedi Paradice LLP

(57) ABSTRACT

A configurable transceiver and method of operation are disclosed that may dynamically switch between a direct-conversion mode and a direct-sampling mode based, at least in part, upon a frequency component of a receive and/or transmit signal. When in the direct-conversion mode, the transceiver may operate as a direct-conversion transceiver, and when in the direct-sampling mode, the transceiver may operate as a direct-sampling transceiver. For some embodiments, a frequency of the receive signal and/or the transmit signal may be compared with a predetermined frequency threshold value to generate a mode signal, and the mode signal may be used to select between the direct-conversion mode and the direct-sampling mode.

17 Claims, 9 Drawing Sheets

RE-CONFIGURABLE RECEIVER ARCHITECTURE FOR CABLE TRANSMISSION

TECHNICAL FIELD

The present embodiments relate generally to communication systems, and specifically to receivers that may be dynamically configured to operate either as direct-conversion receivers or as direct sampling-receivers.

BACKGROUND OF RELATED ART

Direct-sampling receivers sample a received signal without down-converting the received signal. In contrast, direct-conversion receivers down-convert the received signal to generate in-phase (I) and quadrature (Q) signals, and then sample the I and Q signals. Down-converting the received signal allows for a lower-frequency sampling clock (as compared to direct-sampling receivers), but introduces signal impairments resulting from local oscillator noise and/or I/Q mismatch.

The Nyquist theorem calls for the sampling clock frequency to be at least twice the highest frequency component in the received signal to prevent aliasing. For example, to directly sample signals having a carrier frequency of 197 MHz, a sampling clock having a frequency of at least 2×197 MHz=394 MHz is typically used. Many direct-sampling receivers employ a sampling clock having a frequency that is several times greater than the Nyquist rate to ease the anti-alias filtering requirements. Generating a stable high-frequency sampling clock may be expensive and/or difficult. In addition, as the sampling clock frequency increases, the cost, size, and complexity of analog-to-digital converters (ADCs) employed as sampling circuits also increases.

Thus, although direct-conversion receivers may employ lower-frequency sampling clocks and less complex ADCs than direct-sampling receivers, direct-conversion receivers suffer from signal impairments resulting from I/Q mismatch and local oscillator noise. Accordingly, there is an undesirable trade-off between direct-sampling receivers and direct-conversion receivers. The disadvantages of this trade-off are exacerbated when the received signal has a large channel bandwidth.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A configurable receiver and method of operation are disclosed that may dynamically switch between a direct-conversion mode and a direct-sampling mode (e.g., based, at least in part, upon a frequency component of a receive and/or transmit signal). When in the direct-conversion mode, the receiver may operate as a direct-conversion receiver, and when in the direct-sampling mode, the receiver may operate as a direct-sampling receiver. For some embodiments, a frequency of the receive signal and/or the transmit signal may be compared with a predetermined frequency threshold value to generate a mode signal, and the mode signal may be used to select between the direct-conversion mode and the direct-sampling mode.

For some embodiments, the receiver includes an in-phase (I) path, a quadrature (Q) path, and a control circuit. The I path includes a first mixer to selectively down-convert an input signal using a first local oscillator signal or block the input signal in response to the mode signal. The Q path includes a second mixer to selectively down-convert the input signal using a second local oscillator signal or pass the input signal in response to the mode signal. The control circuit may generate the mode signal in response to a frequency of the input signal. For some embodiments, the control circuit may drive the mode signal to a first state to indicate the direct-conversion mode when the frequency of the input signal is greater than a predetermined value, and may drive the mode signal to a second state to indicate the direct-sampling mode when the frequency of the input signal is less than or equal to the predetermined value.

More specifically, when the receiver is configured to operate in the direct-conversion mode, switching circuitry may simultaneously enable the I path and the Q path. For some embodiments, the I path may be enabled and configured to down-convert the input signal by providing a first local oscillator signal to the first mixer, and the Q path may be enabled and configured to down-convert the input signal by providing a second local oscillator signal to the second mixer.

Conversely, when the receiver is configured to operate in the direct-sampling mode, the switching circuitry may disable the I path and enable the Q path as a simple gain stage. For some embodiments, the I path may be disabled to block the input signal by providing a first fixed voltage (e.g., ground potential) to the first mixer, and the Q path may be enabled and configured to pass the input signal without frequency down-conversion by providing a second fixed voltage (e.g., a supply voltage) to the second mixer.

By dynamically switching between direct-conversion and direct-sampling modes, receivers of the present embodiments may take advantage of a lower-frequency sampling clock when the input signal frequency is greater than the threshold value, and may avoid signal impairments resulting from I/Q mismatch and local oscillator noise when the input signal frequency is less than or equal to the threshold value.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

The present embodiments are discussed below in the context of processing signals having exemplary frequency values for simplicity only. It is to be understood that the present embodiments are equally applicable for processing signals of various suitable frequencies and/or frequency ranges.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 1:
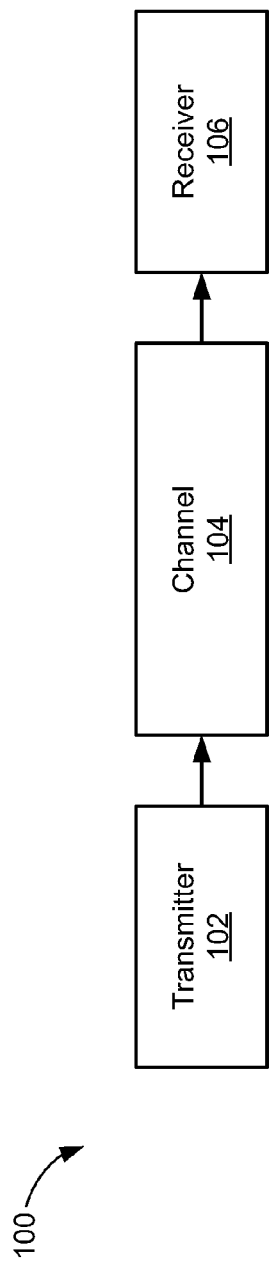
FIG. 1 illustrates a communications system in accordance with some embodiments.

FIG. 1 illustrates a communications system 100 in accordance with some embodiments. A transmitter 102 transmits a signal onto a channel 104, and a receiver 106 receives the signal from the channel 104. For some embodiments, the channel 104 is a wired link (e.g., a coaxial cable or other physical connection), and transmitter 102 and/or receiver 106 may be devices that exchange data using Ethernet communications, Ethernet passive optical network (EPON) communications, Ethernet protocol over coaxial (EPoC) communications, and/or other suitable types of wired communications. For other embodiments, the channel 104 may be a wireless medium, and transmitter 102 and/or receiver 106 may be devices that exchange data using Wi-Fi communications, Bluetooth communications, near-field communications (NFC), and/or other suitable types of wireless communications.

Figure 2:
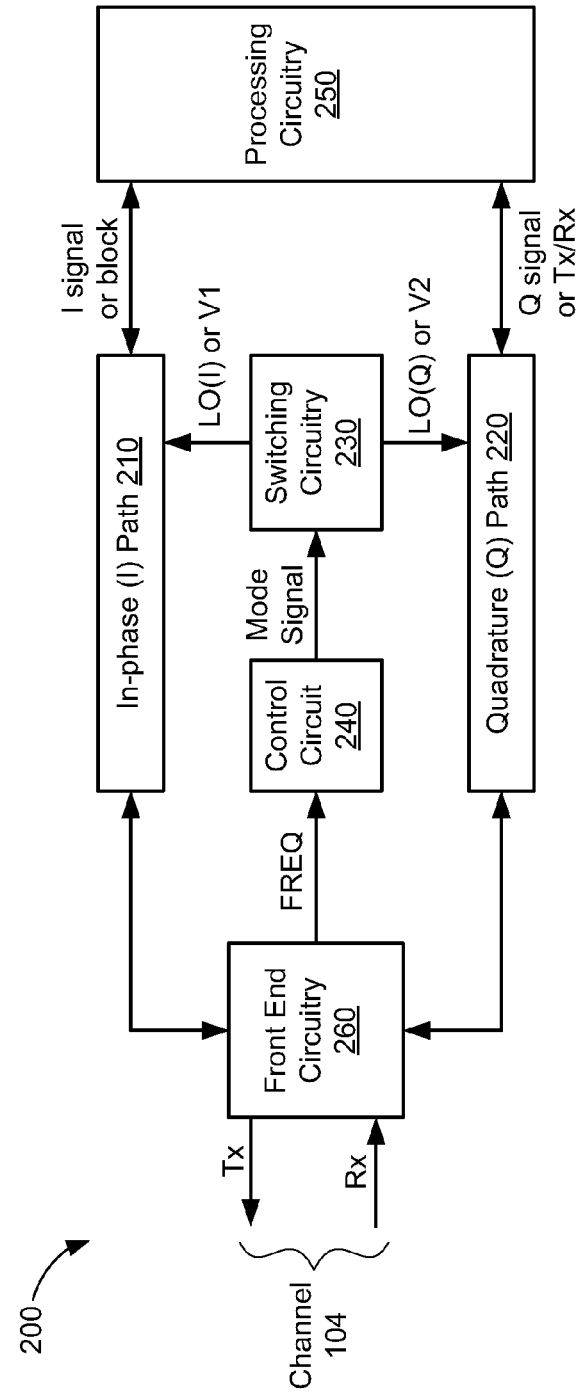
FIG. 2 is a block diagram of a configurable transceiver in accordance with some embodiments.

FIG. 2 is a block diagram of a configurable transceiver 200 in accordance with some embodiments. The transceiver 200 may be included within a communication device (e.g., communication device 600, FIG. 6), and perform the functions associated with transmitter 102 and/or receiver 106 of FIG. 1. The transceiver 200 is shown in FIG. 2 as including an in-phase (I) path 210, a quadrature (Q) path 220, switching circuitry 230, a control circuit 240, processing circuitry 250, and front-end circuitry 260.

The I path 210, which is coupled between front-end circuitry 260 and processing circuitry 250, may include various elements such as mixers, local oscillators, amplifiers, filters, analog-to-digital converter (ADCs), and digital-to-analog converters (DACs). The Q path 220, which is coupled between front-end circuitry 260 and processing circuitry 250, may include various elements such as mixers, local oscillators, amplifiers, filters, analog-to-digital converter (ADCs), and digital-to-analog converters (DACs). When transceiver 200 operates in a direct-conversion mode, the I path 210 and the Q path 220 may operate together as quadrature amplitude modulation (QAM) transceiver that processes in-phase (I) and quadrature (Q) signals. When transceiver 200 operates in a direct-sampling mode, the I path 210 may be disabled and the Q path 220 may operate as a direct sampling transceiver that processes signals without frequency conversions.

The processing circuitry 250 may include a transmit baseband processor and a receive baseband processor (not shown for simplicity). The receive baseband processor may process receive (Rx) signals received from channel 104, and the transmit baseband processor may process transmit (Tx) signals to be transmitted to channel 104.

Front-end circuitry 260 is coupled to channel 104, to I path 210, Q path 220, and control circuit 240. Front-end circuitry 260, which receives the RX signals from channel 104 and provides the Tx signals to channel 104, may include a number of analog components such as low-noise amplifiers (LNAs), variable-gain amplifiers (VGAs), power amplifiers (PAs), mixers, filters, and the like. For some embodiments, front-end circuitry 260 may provide a frequency (FREQ) value or values indicative of one or more frequency components of the Rx and/or Tx signals. For at least some embodiments, the frequency value(s) may indicate the highest frequency component of the RX and/or TX signals, for example, for applications in which the RX and TX signals are modulated signals with multiple sub-carrier signal frequencies (e.g., carrying OFDM symbols).

Control circuit 240 receives the frequency value (FREQ), and may compare the frequency value with a predetermined threshold value to generate a mode signal. For some embodiments, control circuit 240 drives the mode signal to a first state to indicate a direct-conversion mode of operation when the frequency value is greater than the predetermined frequency threshold value, and drives the mode signal to a second state to indicate a direct-sampling mode of operation when the frequency value is less than or equal to the predetermined frequency threshold value.

Switching circuitry 230, which is coupled to the I path 210, the Q path 220, and control circuit 240, may cause configurable transceiver 200 to selectively operate either as a direct-conversion transceiver or as a direct-sampling transceiver in response to the mode signal. For example, when the mode signal indicates the direct-conversion mode, switching circuitry 230 may provide an in-phase local oscillator signal LO(I) to I path 210 and provide a quadrature local oscillator signal LO(Q) to Q path 220. In response to LO(I), the I path 210 may down-convert the Rx signal using the LO(I) signal to generate the in-phase (I) signal, and may up-convert an I signal (e.g., received from processing circuitry 250) using the LO(I) signal to generate the Tx signal. In response to LO(Q), the Q path 220 may down-convert the Rx signal using the LO(Q) signal to generate the quadrature (Q) signal, and may up-convert a Q signal (e.g., received from processing circuitry 250) using the LO(Q) signal to generate the Tx signal.

Conversely, when the mode signal indicates the direct-sampling mode, switching circuitry 230 may provide a first fixed voltage (V1) to I path 210 and provide a second fixed voltage (V2) to Q path 220. In response to the first fixed voltage V1, the I path 210 may be disabled and therefore not process signals (e.g., thereby blocking signals provided by front-end circuitry 260 and/or processing circuitry 250). In response to the second fixed voltage V2, the Q path 220 may pass signals (e.g., without frequency conversion) between front-end circuitry 260 and processing circuitry 250.

Figure 3A:
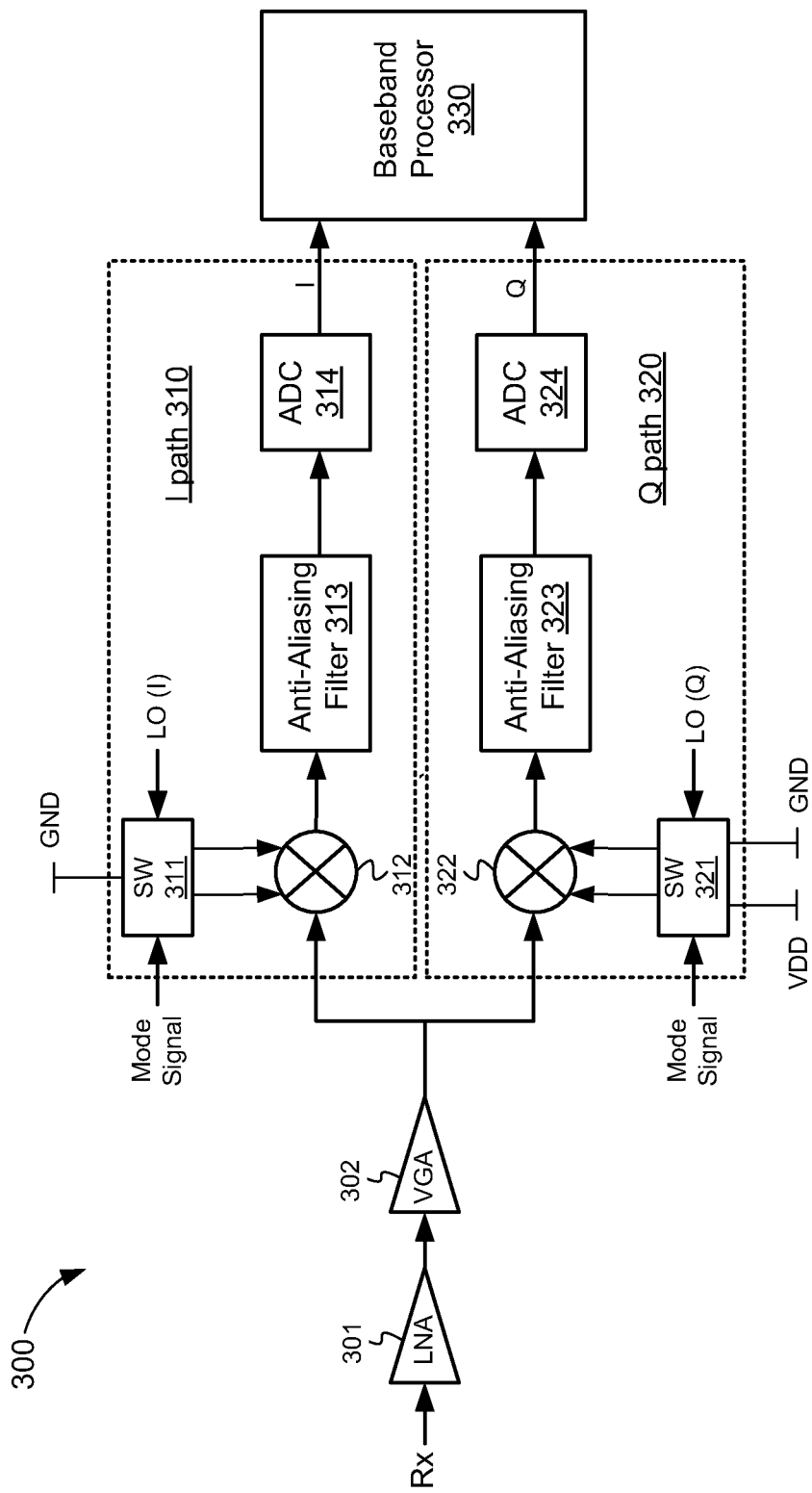
FIGS. 3A-3C are block diagrams of a configurable receiver in accordance with some embodiments.

FIG. 3A shows a configurable receiver 300 in accordance with some embodiments. Receiver 300 is shown to include an LNA 301, a VGA 302, an I path 310, a Q path 320, and a baseband processor 330. LNA 301 and VGA 302, which may be formed as part of front-end circuitry 260 of FIG. 2, receive and amplify the Rx signal (received from channel 104). The amplified Rx signal is provided to the I path 310 and the Q path 320.

The I path 310, which may be one embodiment of the I path 210 of FIG. 2, includes a first switch 311, a first mixer 312, a first anti-aliasing filter 313, and a first ADC 314. Switch 311 includes inputs coupled to in-phase local oscillator signal LO(I) and ground potential (GND), includes a control input to receive the mode signal, and includes outputs coupled to mixer 312. Switch 311 may be any suitable switch that selectively provides either the LO(I) signal or ground potential to first mixer 312 in response to the mode signal. For at least some embodiments, switch 311 may be a tri-state buffer. Further, although FIG. 3A depicts ground potential as the first fixed voltage V1, any other fixed voltage that disables first mixer 312 may be used.

The Q path 320, which may be one embodiment of the Q path 220 of FIG. 2, includes a second switch 321, a second mixer 322, a second anti-aliasing filter 323, and a second ADC 324. Switch 321 includes inputs coupled to quadrature local oscillator signal LO(Q), ground potential, and the supply voltage (VDD), includes a control input to receive the mode signal, and includes outputs coupled to mixer 322. Switch 321 may be any suitable switch that selectively provides either the LO(Q) signal or VDD/GND to second mixer 322 in response to the mode signal. For at least some embodiments, switch 321 may be a tri-state buffer. Further, although FIG. 3A depicts VDD/GND as the second fixed voltage V2, any other fixed voltage that causes second mixer 322 to pass the input signal without frequency down-converting may be used.

The LO(I) and LO(Q) signals may be any suitable local oscillator signals, and may be generated by any suitable clock generator(s) such as, for example, a crystal oscillator. For an exemplary embodiment in which the receive signal Rx has a frequency bandwidth between 5 MHz and 197 MHz, the frequency of the LO(I) and LO(Q) signals may be approximately 101 MHz (e.g., which lies near a midpoint of the frequency bandwidth of the receive signal Rx).

Figure 3B:
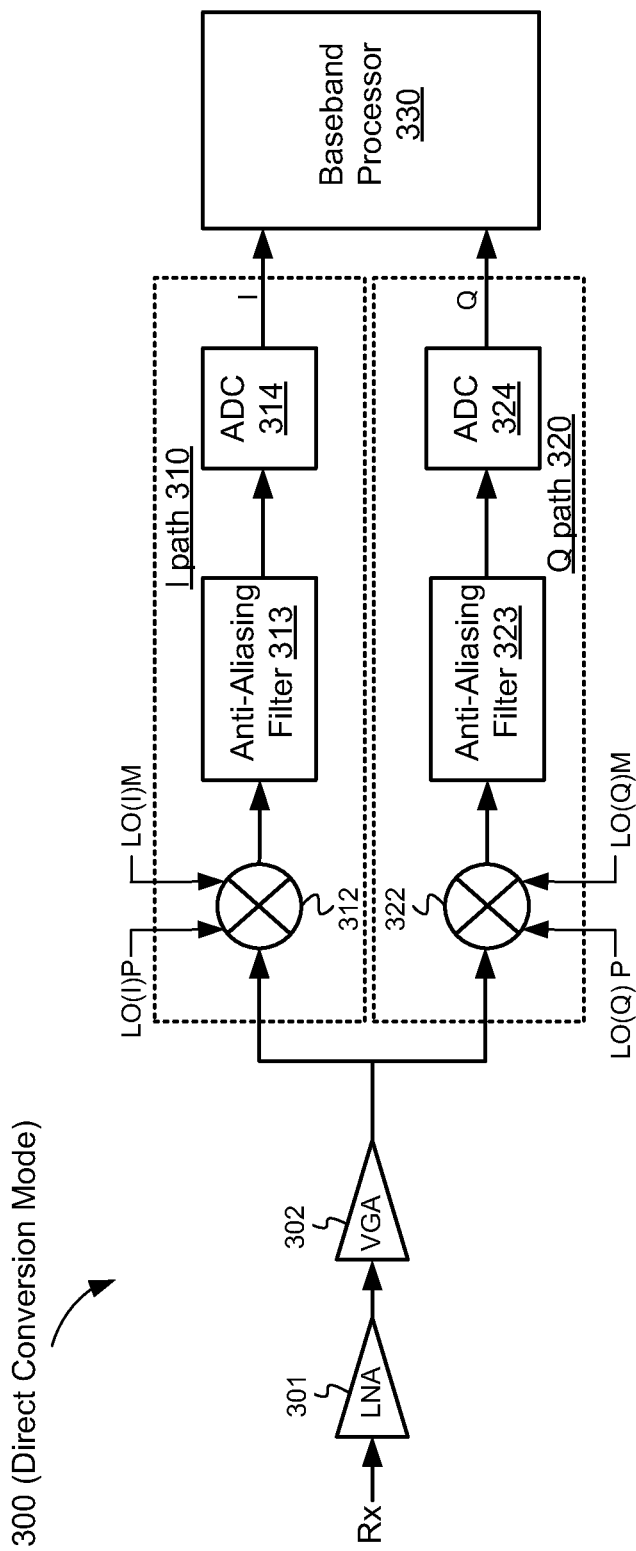

For some embodiments, one or both of mixers 312 and 322 may include one or more Gilbert cells (as described below with respect to FIGS. 4A-4C). For such embodiments, the LO(I) signal may include two signals LO(I)M and LO(I)P, and the LO(Q) signal may include two signals, LO(Q)M and LO(Q)P (e.g., as depicted in FIG. 3B).

Baseband processor 330, which may form part of one embodiment of processing circuitry 250 of FIG. 2, is coupled to the I path 310 and the Q path 320. In operation, baseband processor 330 is to process signals received from the I path 310 and/or Q path 320 (e.g., to recover data or other information encoded within signals received from the I path 310 and/or Q path 320).

The components described with reference to FIG. 3A are exemplary only. In various embodiments, one or more of the components described may be omitted, combined, or modified, and additional components may be included.

An exemplary operation of receiver 300 is described below with respect to FIGS. 2 and 3A-3C. For this exemplary discussion, the receive signal Rx has a frequency bandwidth between 5 MHz and 197 MHz, the local oscillator signals LO(I) and LO(Q) each have a frequency of 101 MHz, and the predetermined frequency threshold value may be 96 MHz. The receiver 300 receives the Rx signal, front-end circuitry 260 determines a highest frequency (FREQ) of the Rx signal, and control circuit 240 compares FREQ with the predetermined frequency threshold value.

For other embodiments, other circuits (e.g., processing circuitry 250) may determine the highest frequency component (FREQ) of the Rx signal and/or may compare FREQ with the predetermined frequency threshold value. For at least one embodiment, the value of FREQ may be provided within (or otherwise associated with) the receive signal Rx. For one example, the value of FREQ may be encoded (e.g., using one or more OFDM symbols) within the receive signal Rx. For another example, the value of FREQ may be provided within a preamble frame of the receive signal Rx, or alternatively may be provided to receiver 300 during negotiation of channel 104 (e.g., by transmitter 102).

If the value of FREQ is greater than the predetermined frequency threshold value, then receiver 300 is to operate in a direct-conversion mode (e.g., as a direct-conversion receiver, depicted in FIG. 3B). Because the value of FREQ is greater than the predetermined frequency threshold value, the control circuit 240 drives the mode signal to the first state. In response thereto, both the I path 310 and the Q path 320 are enabled and configured to down-convert the receive signal Rx (e.g., to baseband). More specifically, in response to the first state of the mode signal, first switch 311 provides in-phase local oscillator signal LO(I) to first mixer 312, and second switch 321 provides quadrature local oscillator signal LO(Q) to second mixer 322. In response thereto, mixers 312 and 322 down-convert the receive signal Rx into baseband I and Q signals by mixing the receive signal Rx with local oscillator signals LO(I) and LO(Q), respectively. For some embodiments, the frequency of the local oscillator signals LO(I) and LO(Q) may be the carrier frequency.

Figure 4A:
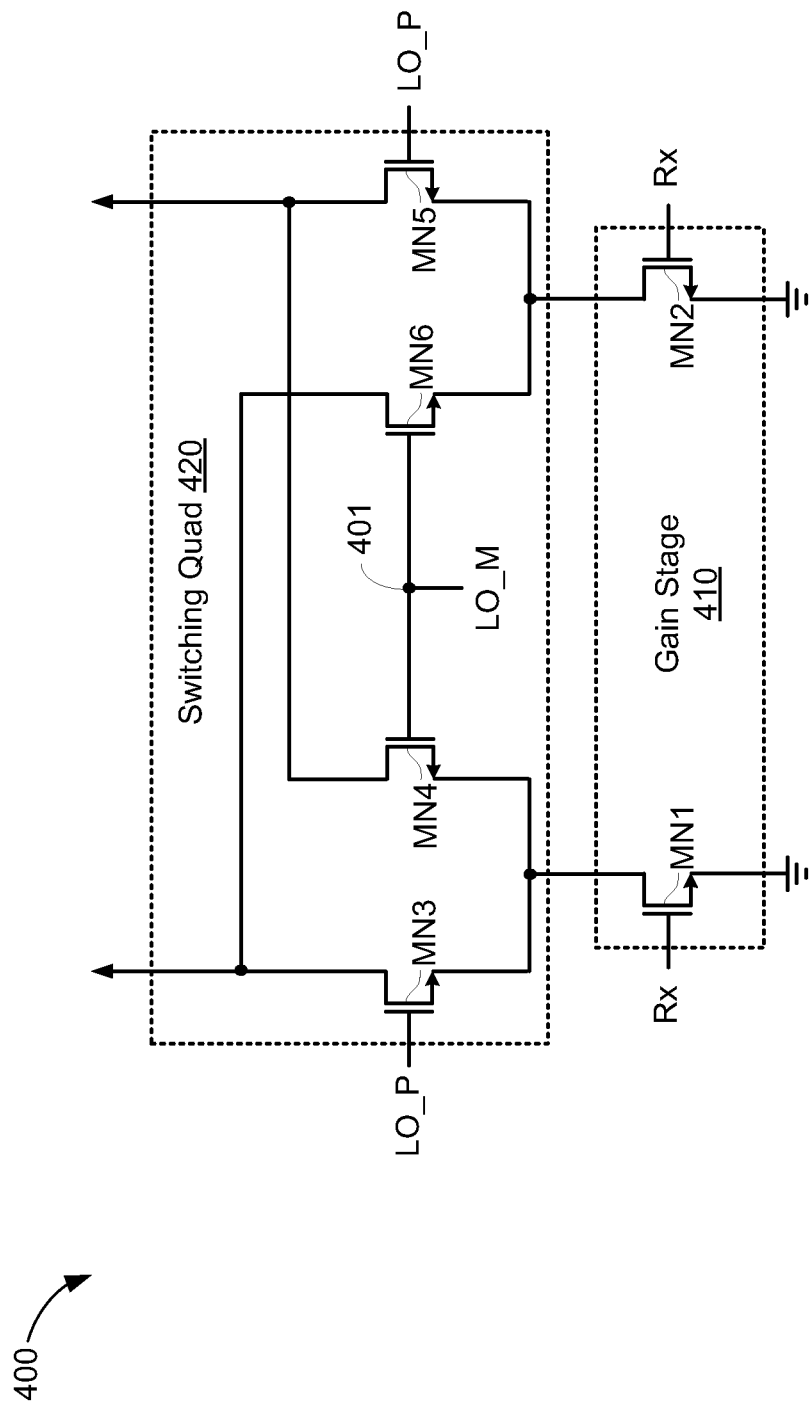
FIGS. 4A-4C are block diagrams of a Gilbert cell that may be employed within the mixers of FIG. 3A in accordance with some embodiments.

FIG. 4A shows a portion of a Gilbert cell 400 that may be provided within mixers 312 and 322. Gilbert cell 400 is shown in FIG. 4A as receiving local oscillator signals LO when receiver 300 is configured to operate as a direct-conversion receiver. The general operation of Gilbert cell 400, which is shown to include a gain stage 410 and a switching quad block 420, and, is known to those skilled in the art and thus is not described herein. When receiver 300 is configured to operate as a direct-conversion receiver, the receive signal Rx is provided to gates of transistors MN1 and MN2 of the gain stage 410, local oscillator signal LO_P is provided to gates of transistors MN3 and MN5, and local oscillator signal LO_M is provided to a bias terminal 401 of Gilbert cell 400. In response to local oscillator signals LO_M and LO_P, Gilbert cell 400 of FIG. 4A down-converts the receive signal Rx to baseband signal I or Q.

By down-converting the receive signal Rx into baseband I and Q signals using mixers 312 and 322, respectively, a corner frequency of filters 313 and 323 may be reduced and/or the sampling clock frequency for ADCs 314 and 324 may be reduced (e.g., as compared to direct-sampling receivers that do not down-convert the receive signal Rx into baseband I and Q signals). For example, if the receive signal Rx has a frequency of $f_{Rx}$, then down-converting the receive signal Rx to baseband I and Q signals having a frequency of $f_{RX}/2$ may allow the ADCs 314 and 324 to sample the signals using a sampling clock having a frequency that is approximately one-half the frequency of a sampling clock used in direct-sampling receivers.

Figure 3C:
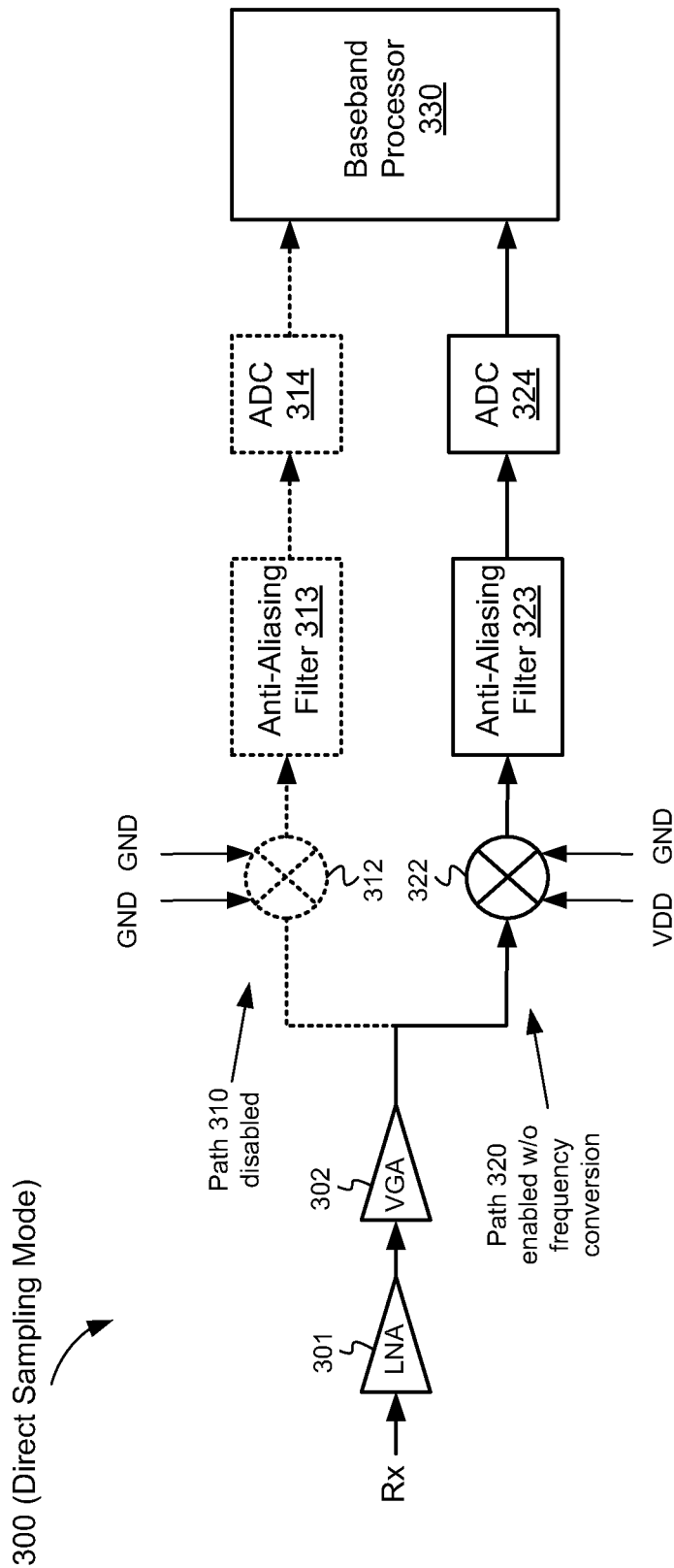

Referring again to FIG. 3A, if the value of FREQ is less than or equal to the predetermined frequency threshold value, then receiver 300 is to operate in a direct-sampling mode (e.g., as a direct-sampling receiver, depicted in FIG. 3C). Because the value of FREQ is less than or equal to the predetermined frequency threshold value, the control circuit 240 drives the mode signal to the second state. In response thereto, the I path 310 is disabled and the Q path 320 is enabled and configured to pass the receive signal Rx without frequency down-conversion. More specifically, in response to the second state of the mode signal, first switch 311 grounds both oscillator inputs of first mixer 312, and second switch 321 grounds a bias input of second mixer and drives differential inputs of second mixer 322 to VDD. In response thereto, the first mixer 312 blocks the receive signal Rx from propagating through the I path 310, and the second mixer 322 passes the receive signal Rx without frequency down-conversion through the Q path 320.

Figure 4B:
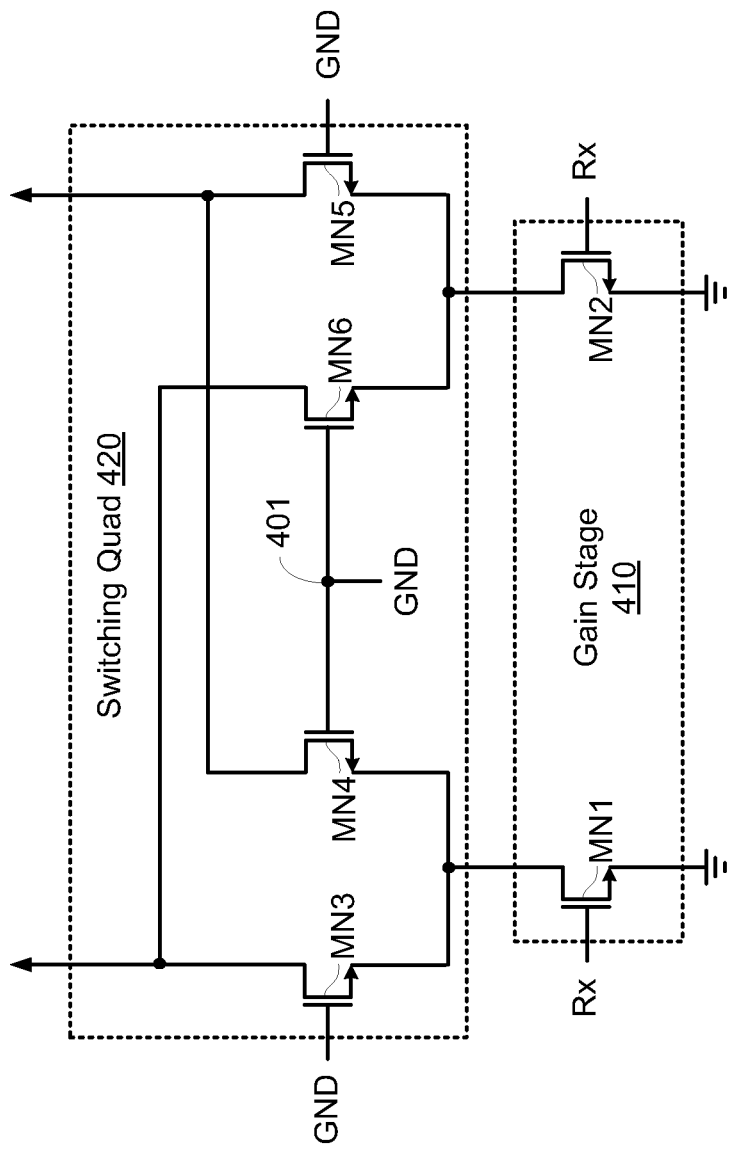

More specifically, FIG. 4B shows a portion of Gilbert cell 400 provided within first mixer 312 and configured to receive first fixed voltage V1 (e.g., ground potential) when receiver 300 is configured to operate as a direct-sampling receiver. The gates of transistors MN3 and MN5, and the bias terminal 401 of Gilbert cell 400, are tied to ground potential via the first switch 311. In response thereto, Gilbert cell 400 of FIG. 4B is disabled and therefore mixer 312 does not pass the receive signal Rx onto the I path 310 of receiver 300.

Figure 4C:
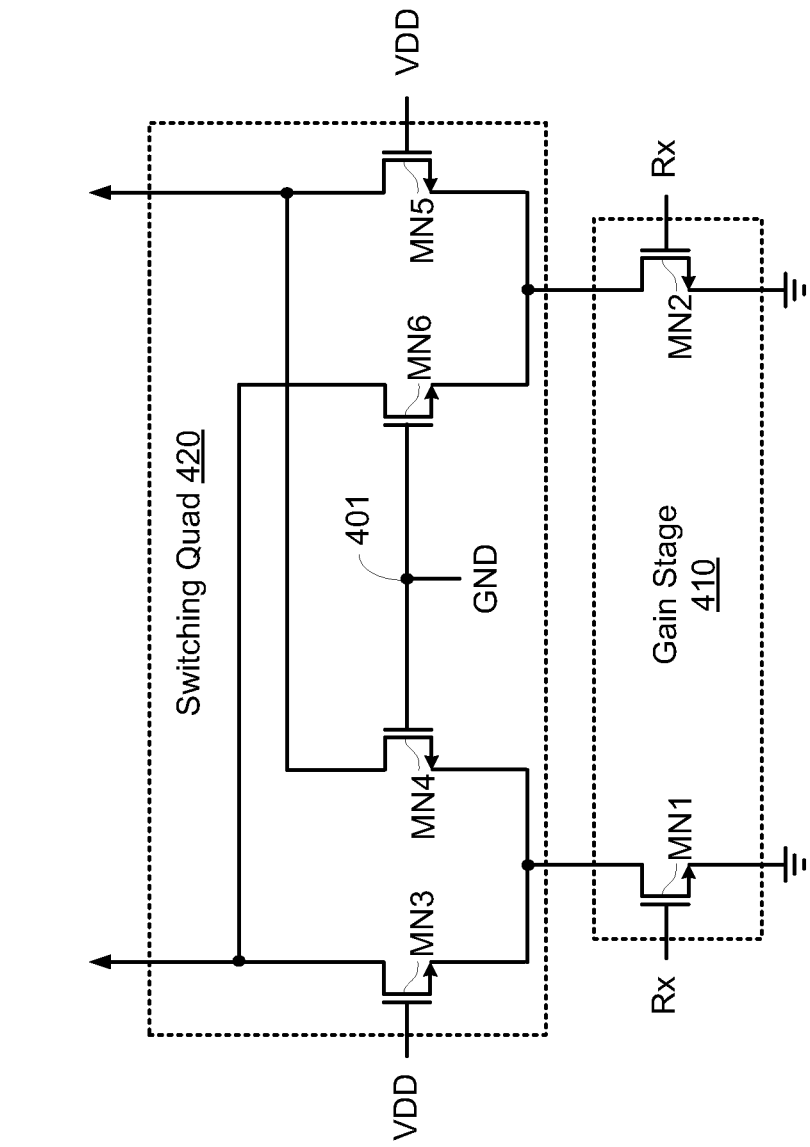

FIG. 4C shows a portion of Gilbert cell 400 provided within second mixer 322 and configured to receive the second fixed voltage V2 (e.g., VDD) when receiver 300 is configured to operate as a direct-sampling receiver. The gates of transistors MN3 and MN5 are coupled to VDD via the second switch 321, and the bias terminal 401 of Gilbert cell 400 is coupled to ground potential via the second switch 321. In response thereto, the Gilbert cell 400 of FIG. 4C is configured to operate as a simple gain stage to pass the receive signal Rx, without frequency down-conversion, to the Q path 320 of receiver 300.

By configuring the I path 310 to block the receive signal Rx and configuring the Q path 320 to pass the receive signal Rx without frequency down-conversion (in response to the second state of the mode signal), the receiver 300 of FIG. 3C directly samples the receive signal Rx using the Q path 320. Although the mixer 322 may provide a gain for the receive signal Rx, the mixer 322 does not alter the frequency of the receive signal Rx. As a result, the ADC 324 of receiver 300 of FIG. 3C directly samples the receive signal Rx using the sampling clock. Although the frequency of the sampling clock used by ADC 324 is greater than that of the sampling clock used in the direct-conversion mode (e.g., because the receive signal Rx is not down-converted to a lower frequency), the receiver 300 of FIG. 3C does not suffer from signal impairments resulting from local oscillator noise or I/Q mismatch.

Figure 5:
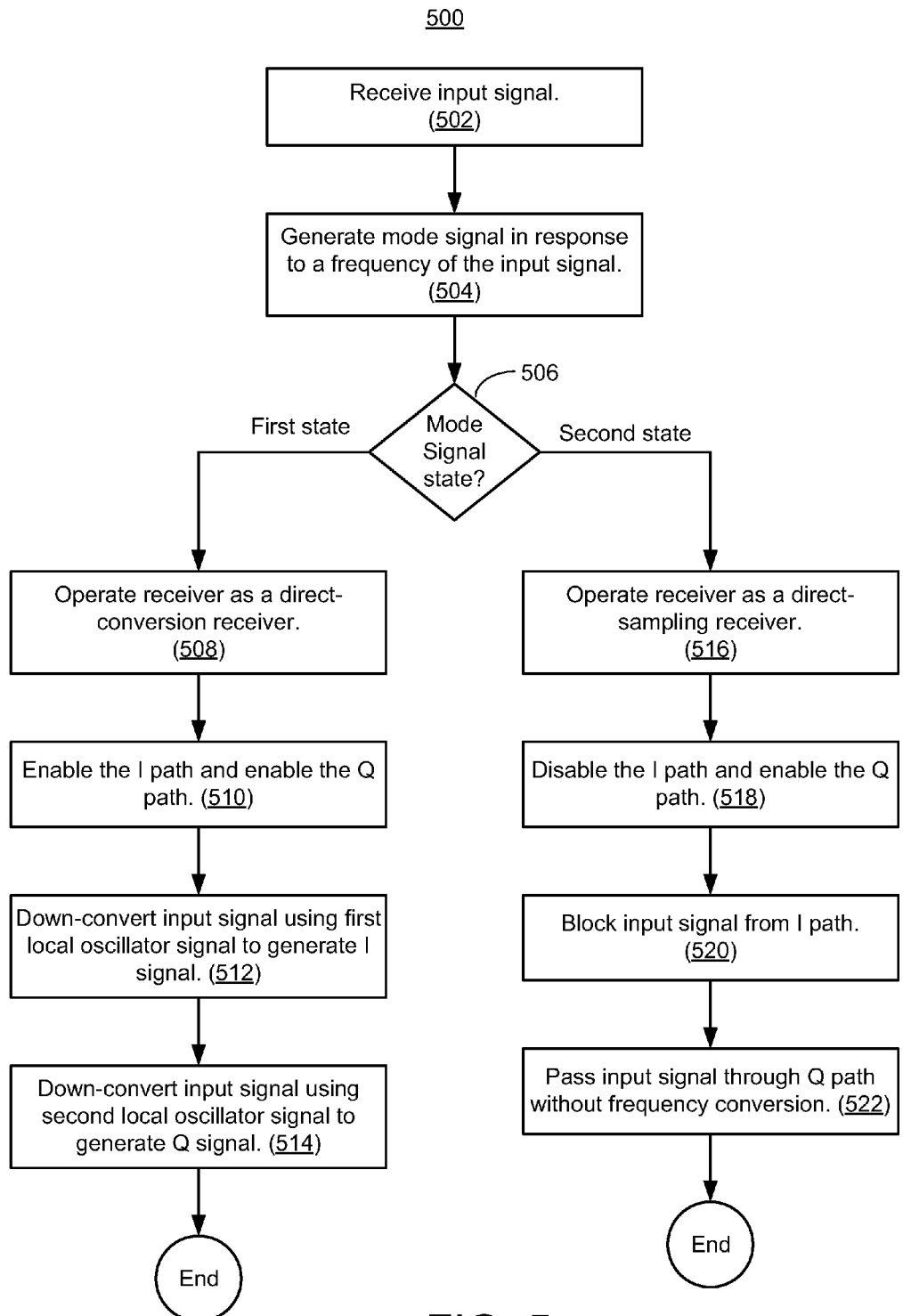
FIG. 5 is a flowchart illustrating a method of operating the configurable receiver of FIGS. 3A-3C in accordance with some embodiments.

FIG. 5 is a flowchart illustrating a method 500 of operating the configurable receiver 300 of FIGS. 3A-3C. First, the receiver 300 receives the input signal (502). For some embodiments, the input signal may be received by front-end circuitry 260 of FIG. 2. Next, the receiver 300 generates a mode signal in response to a frequency of the input signal (502). For some embodiments, the front-end circuitry 260 may provide a frequency value (FREQ) indicative of a frequency component of the input signal to control circuit 240, which in turn compares the frequency value (FREQ) of the input signal with the predetermined frequency threshold value to generate the mode signal. For at least one embodiment, the control circuit 240 may drive the mode signal to the first state when the frequency of the input signal is greater than the predetermined frequency threshold value, and may drive the mode signal to the second state when the frequency of the input signal is less than or equal to the predetermined frequency threshold value.

If the mode signal is in the first state, as tested at 506, then the receiver 300 is to operate as a direct-conversion receiver (e.g., as depicted in FIG. 3B) (508). When receiver 300 is operating in the direct-conversion mode, the I path 310 and the Q path 320 are enabled (510). For some embodiments, first switch 311 may enable the I path 310 by providing the first local oscillator signal LO(I) to the first mixer 312, and second switch 321 may enable the Q path 320 by providing the second local oscillator signal LO(Q) to the second mixer 322. In response thereto, first mixer 312 down-converts the input signal using the first local oscillator signal LO(I) to generate the I signal (512), and second mixer 322 down-converts the input signal using the second local oscillator signal LO(Q) to generate the Q signal (514). In this manner, receiver 300 may operate as a QAM receiver, which as discussed above may allow for a lower-frequency sampling clock (e.g., as compared to direct-sampling receivers) to sample the I and Q signals.

Conversely, if the mode signal is in the second state, as tested at 506, then the receiver 300 is to operate as a direct-sampling receiver (e.g., as depicted in FIG. 3C) (516). When receiver 300 is operating in the direct-sampling mode, the I path 310 is disabled and the Q path 320 is enabled (518). For some embodiments, the first switch 311 may disable the I path 310 by providing the first fixed voltage V1 (e.g., ground potential) to the first mixer 312, and second switch 321 may enable the Q path 320 by providing the second fixed voltage V2 (e.g., VDD and ground potential) to the second mixer 322. In response to the first fixed voltage V1, the first mixer 312 may block the input signal from propagating through the I path 310 (e.g., not pass the input signal) (520). In response to the second fixed voltage V2, the second mixer 322 may pass the input signal without frequency conversion through the Q path 320 (522).

More specifically, by grounding the oscillator signal inputs of the first mixer 312 (or alternatively by grounding the first oscillator signal LO(I) itself), the first switch 311 may prevent the first mixer 312 from passing the input signal through the I path 310. For example, referring to FIG. 4B, grounding the differential inputs (at the gates of transistors MN3 and MN5) and the bias terminal 401 of Gilbert cell 400 may cause Gilbert cell 400 of FIG. 4B (and thus first mixer 312) to block the input signal. Further, by driving the oscillator signal input of the second mixer 322 to the supply voltage VDD, the second switch 321 may cause second mixer 322 to operate as a simple gain stage that amplifies the input signal without altering its frequency. For example, referring to FIG. 4C, coupling the differential inputs (at the gates of transistors MN3 and MN5) of Gilbert cell 400 to VDD while grounding the bias terminal 401 of Gilbert cell 400 may cause Gilbert cell 400 of FIG. 4C (and thus second mixer 322) to pass the input signal. In this manner, receiver 300 may operate as a direct-sampling receiver, which as discussed above may avoid signal impairments resulting from I/Q mismatch and noise associated with the local oscillator signals LO(I) and LO(I) (e.g., as compared to direct-conversion receivers).

While the method 500 includes a number of operations that appear to occur in a specific order, it should be apparent that the method 500 can include more or fewer operations. An order of two or more operations may be changed and two or more operations may be combined into a single operation.

Further, for some embodiments, receiver 300 may be initially configured to operate as a direct-conversion receiver, and dynamically re-configured to operate as a direct-sampling receiver if the frequency value (FREQ) is subsequently determined to be less than (or equal) to the predetermined frequency threshold value.

Figure 6:
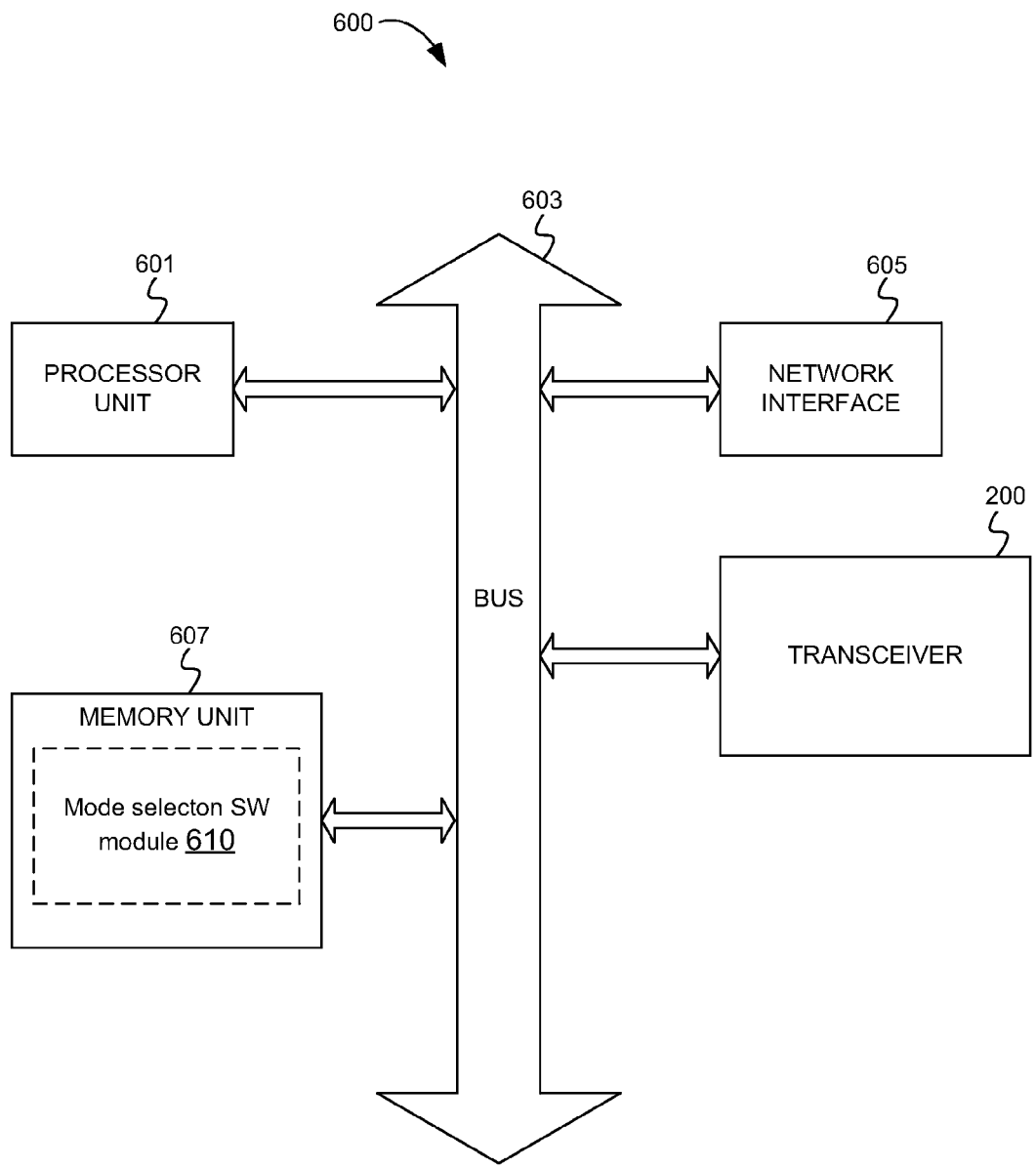
FIG. 6 is a block diagram of a communication device in accordance with some embodiments.

FIG. 6 is an example of a block diagram of a communication device 600 that may include the present embodiments. In some embodiments, the device 600 is a wireless device (e.g., a WLAN device, such as a personal computer, laptop or tablet computer, mobile phone, personal digital assistant, GPS device, wireless access point, or other electronic device). In some embodiments, the device 600 has a wired network connection.

The device 600 includes a processor unit 601, memory unit 607, network interface 605, and transceiver 200 (FIG. 2) coupled by a bus 603. The processor unit 601 includes one or more processors and/or processor cores. For some embodiments, the network interface 605 includes at least one wired network interface (e.g., an Ethernet interface, an EPON interface, an EPoC interface, etc.). For other embodiments, the device 600 includes at least one wireless network interface (e.g., a WLAN interface, a Bluetooth® interface, a WiMAX interface, a ZigBee® interface, a Wireless USB interface, etc.).

The memory unit 607 includes a non-transitory computer-readable storage medium (e.g., one or more nonvolatile memory elements, such as EPROM, EEPROM, Flash memory, a hard disk drive, and so on) that stores a mode selection software module 610. In some embodiments, the software module 610 includes one or more programs with instructions that, when executed by processor unit 601 and/or by the baseband processor 330 (FIG. 3A), cause the communication device 600 to perform the method 500 of FIG. 5.

Although the present embodiments are described above in the context of receiver portions of transceiver 200 of FIG. 2, it is to be understood that the present embodiments are equally applicable to transmitter portions of transceiver 200 of FIG. 2. Further, various aspects and components of the present embodiments may be applicable to any device having I and Q signal paths.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A configurable receiver, comprising:
an in-phase (I) path including a first mixer to either down-convert an input signal using a first local oscillator signal or block the input signal in response to a mode signal;
a quadrature (Q) path including a second mixer to either down-convert the input signal using a second local oscillator signal or pass the input signal in response to the mode signal; and
a control circuit to generate the mode signal based on a frequency of the input signal, wherein a state of the mode signal indicates whether the frequency of the input signal is greater than a predetermined frequency value.

2. The configurable receiver of claim 1, wherein the first local oscillator signal comprises an in-phase local oscillator signal, and the second local oscillator signal comprises a quadrature local oscillator signal.

3. The configurable receiver of claim 1, wherein the control circuit is to:
drive the mode signal to a first state when the frequency of the input signal is greater than the predetermined frequency value; and
drive the mode signal to a second state when the frequency of the input signal is less than or equal to the predetermined frequency value.

4. The configurable receiver of claim 1, wherein:
a first state of the mode signal is to cause the configurable receiver to operate in a direct-conversion mode; and
a second state of the mode signal is to cause the configurable receiver to operate in a direct-sampling mode.

5. The configurable receiver of claim 1, further comprising:
switching circuitry, coupled to the first mixer and the second mixer, to receive the mode signal.

6. The configurable receiver of claim 5, wherein:
when the mode signal is in a first state, the switching circuitry is to simultaneously enable the I path and the Q path; and
when the Mode Signal is in a Second State, the Switching Circuitry is to Disable the I path and to enable the Q path.

7. The configurable receiver of claim 5, wherein:
when the mode signal is in a first state, the switching circuitry is to couple an input of the first mixer to the first local oscillator signal and to couple an input of the second mixer to the second local oscillator signal; and
when the mode signal is in a second state, the switching circuitry is to couple the input of the first mixer to ground potential and to couple the input of the second mixer to a supply voltage.

8. The configurable receiver of claim 1, wherein:
the first mixer includes a first Gilbert cell having differential inputs to receive either the first local oscillator signal or ground potential in response to the mode signal; and
the second mixer includes a second Gilbert cell having differential inputs to receive either the second local oscillator signal or a supply voltage in response to the mode signal.

9. A communication device, comprising:
a receiver to receive an input signal, wherein the receiver includes an in-phase (I) path and a quadrature (Q) path;
one or more processors; and
a memory storing instructions that, when executed by the one or more processors, cause the communication device to:
generate a mode signal based on a frequency of the input signal;
operate the receiver as a direct-conversion receiver when the mode signal is in a first state by enabling the I path and the Q path; and
operate the receiver as a direct-sampling receiver when the mode signal is in a second state by disabling the I path while enabling the Q path.

10. The communication device of claim 9, wherein execution of the instructions to generate the mode signal causes the communication device to:
drive the mode signal to the first state when the frequency of the input signal is greater than a predetermined value; and
drive the mode signal to the second state when the frequency of the input signal is less than or equal to the predetermined value.

11. The communication device of claim 9, wherein:
execution of the instructions to operate the receiver as the direct-conversion receiver causes the communication device to:
down-convert the input signal using a first local oscillator signal to generate an I signal; and
down-convert the input signal using a second local oscillator signal to generate a Q signal; and
execution of the instructions to operate the receiver as the direct-sampling receiver causes the communication device to:
block the input signal from the I path; and
pass the input signal through the Q path.

12. A method for dynamically configuring a receiver including an in-phase (I) path and a quadrature (Q) path, the method comprising:
- receiving an input signal;
- generating a mode signal based on a frequency of the input signal;
- operating the receiver as a direct-conversion receiver when the mode signal is in a first state by enabling the I path and the Q path; and
- operating the receiver as a direct-sampling receiver when the mode signal is in a second state by disabling the I path while enabling the Q path.

13. The method of claim 12, wherein the generating comprises:
- comparing the frequency with a predetermined value;
- driving the mode signal to the first state when the frequency of the input signal is greater than the predetermined value; and
- driving the mode signal to the second state when the frequency of the input signal is less than or equal to the predetermined value.

14. The method of claim 12, wherein:
operating the receiver as the direct-conversion receiver comprises:
- down-converting the input signal using a first local oscillator signal to generate an I signal; and
- down-converting the input signal using a second local oscillator signal to generate a Q signal; and operating the receiver as the direct-sampling receiver comprises:
- blocking the input signal from the I path; and
- passing the input signal through the Q path.

15. A configurable transceiver including an in-phase (I) path and a quadrature (Q) path, the configurable transceiver comprising:
- means for receiving an input signal;
- means for generating a mode signal based on a frequency of the input signal;
- means for operating the receiver as a direct-conversion receiver when the mode signal is in a first state by enabling the I path and the Q path; and
- means for operating the receiver as a direct-sampling receiver when the mode signal is in a second state by disabling the I path while enabling the Q path.

16. The configurable transceiver of claim 15, wherein the means for generating comprises:
- means for comparing the frequency with a predetermined value;
- means for driving the mode signal to the first state when the frequency of the input signal is greater than the predetermined value; and
- means for driving the mode signal to the second state when the frequency of the input signal is less than or equal to the predetermined value.

17. The configurable transceiver of claim 15, wherein:
the means for operating the receiver as the direct-conversion receiver is to:
- down-convert the input signal using a first local oscillator signal to generate an I signal; and
- down-convert the input signal using a second local oscillator signal to generate a Q signal; and the means for operating the receiver as the direct-sampling receiver is to:
- block the input signal from the I path; and
- pass the input signal through the Q path.

* * * * *